(12) United States Patent
Kato et al.

(10) Patent No.: US 7,561,046 B2
(45) Date of Patent: Jul. 14, 2009

(54) RADIO TAG READING APPARATUS

(75) Inventors: Masakazu Kato, Numazu (JP);
Sadatoshi Oishi, Fuji (JP)

(73) Assignee: Toshiba Tec Kabushiki Kaisha (JP)

( * ) Notice: Subject to any disclaimer, the term of this patent is extended or adjusted under 35 U.S.C. 154(b) by 329 days.

(21) Appl. No.: 11/517,423

(22) Filed: Sep. 7, 2006

(65) Prior Publication Data
US 2007/0013482 A1    Jan. 18, 2007

Related U.S. Application Data

(63) Continuation of application No. PCT/JP2005/020027, filed on Oct. 31, 2005.

(30) Foreign Application Priority Data
Nov. 10, 2004    (JP)    ............ 2004-326698

(51) Int. Cl.
G08B 13/14    (2006.01)
G06K 15/00    (2006.01)
G06F 19/00    (2006.01)
G06K 19/06    (2006.01)
H01L 35/00    (2006.01)
H01Q 1/36    (2006.01)
H01Q 19/00    (2006.01)
H01Q 13/10    (2006.01)
H01Q 13/00    (2006.01)

(52) U.S. Cl. ............. 340/572.1; 340/572.2; 340/572.5; 340/572.7; 235/383; 235/385; 235/492; 343/700 R; 343/756; 343/770; 343/776

(58) Field of Classification Search ............... 340/10.1, 340/572.1, 572.7, 572.3; 235/385, 492; 343/700, 343/756, 770, 776, 700 R
See application file for complete search history.

(56) References Cited

U.S. PATENT DOCUMENTS

| 6,104,291 | A  | * | 8/2000 | Beauvillier et al. | ...... 340/572.1 |
| 6,437,744 | B1 | * | 8/2002 | Akiyama et al. | ...... 343/700 MS |
| 7,176,799 | B1 | * | 2/2007 | Golicz et al. | ............. 340/572.1 |
| 7,432,874 | B2 | * | 10/2008 | Meissner | ..................... 343/867 |

FOREIGN PATENT DOCUMENTS

| JP | 2003-283364 | 10/2003 |
| JP | 2005-165473 | 6/2005 |
| WO | WO 03/058550 | 7/2003 |

* cited by examiner

Primary Examiner—Benjamin C Lee
Assistant Examiner—Lam P Pham
(74) Attorney, Agent, or Firm—Harness Dickey & Pierce, P.L.C.

(57) ABSTRACT

A reader antenna is connected to an interrogator. Conductors are arranged at two places at the opposed marginal edge portions of a radiation plane of the reader antenna along a radiation direction of an electromagnetic wave from the reader antenna. The conductors raises the electric power density above the reader antenna. A storage case is set above the reader antenna and has many items arranged at narrow intervals with radio tags attached thereto. The storage container has the radio tags arranged substantially parallel to the polarization direction of the reader antenna. By doing so, adequate drive power is applied to the radio tag by an electromagnetic wave from the reader antenna.

11 Claims, 8 Drawing Sheets

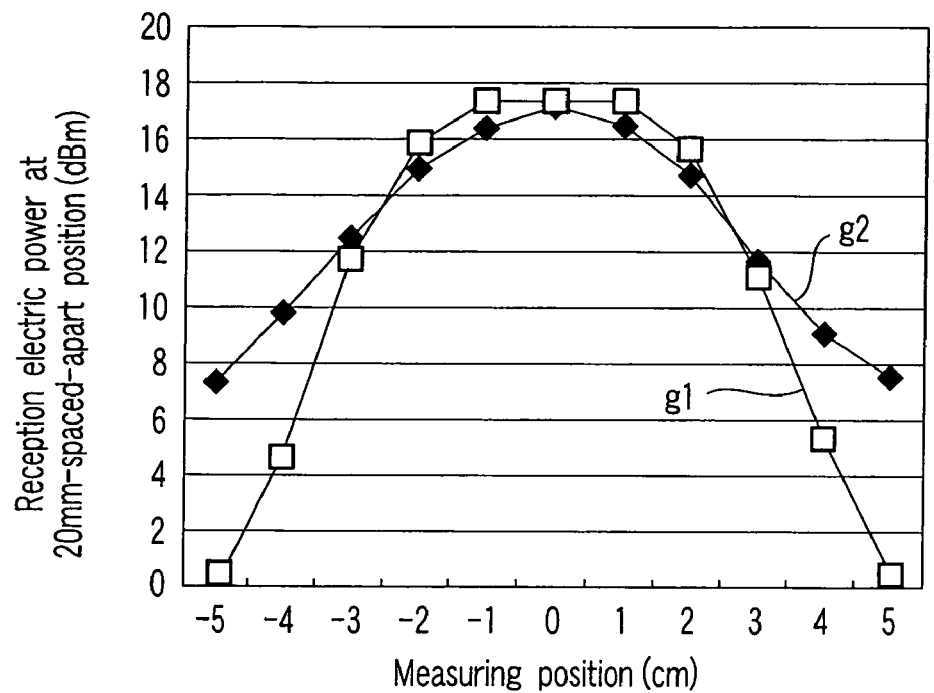
F I G. 5
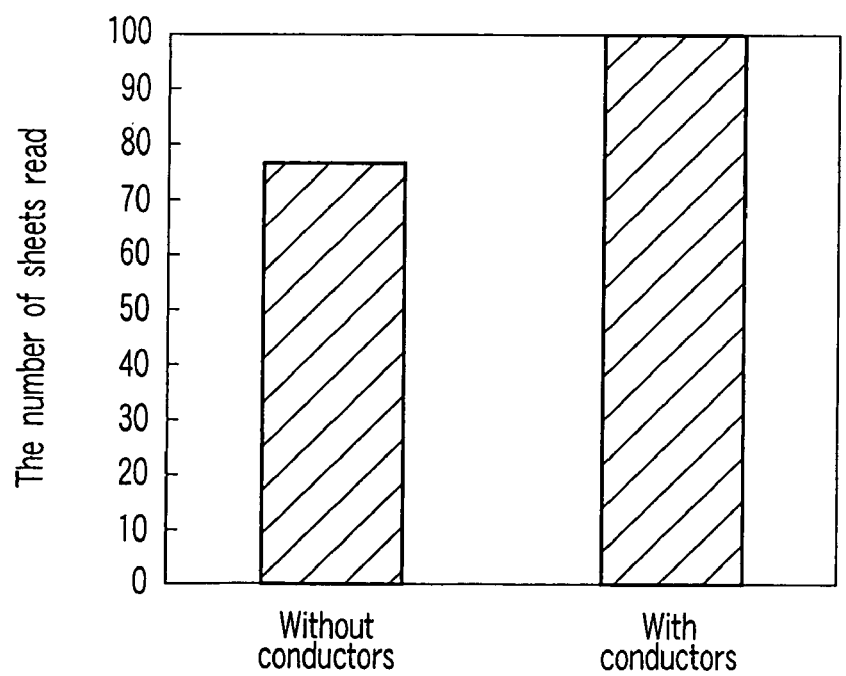
F I G. 6

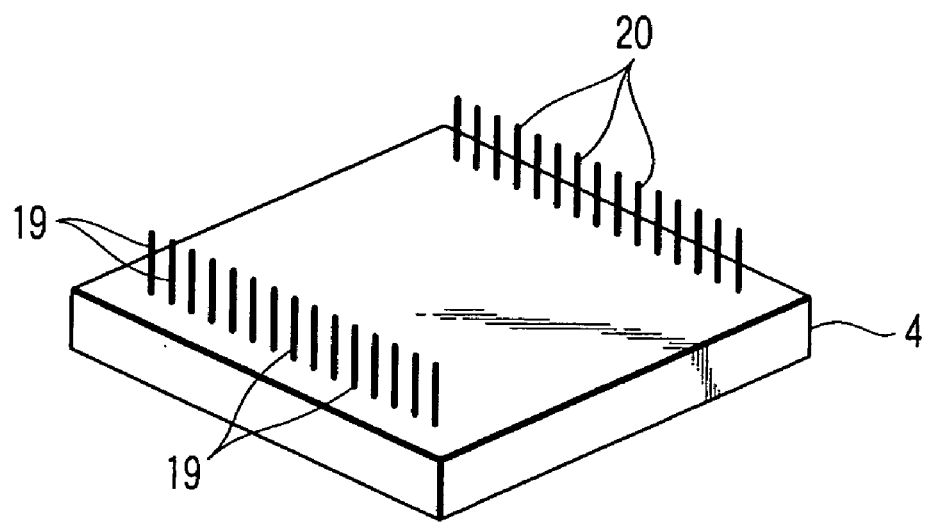
F I G. 13
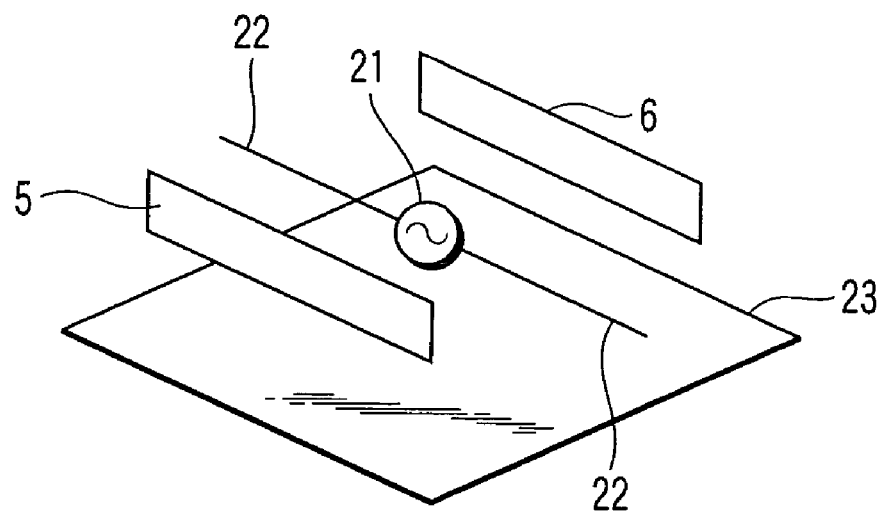
F I G. 14

RADIO TAG READING APPARATUS

CROSS-REFERENCE TO RELATED APPLICATIONS

This is a Continuation Application of PCT Application No. PCT/JP2005/020027, filed Oct. 31, 2005, which was published under PCT Article 21(2) in Japanese.

This application is based upon and claims the benefit of priority from prior Japanese Patent Application No. 2004-326698, filed Nov. 10, 2004, the entire contents of which are incorporated herein by reference.

BACKGROUND OF THE INVENTION

1. Field of the Invention

The present invention relates to a radio tag reading apparatus for reading data from a plurality of radio tags.

2. Description of the Related Art

A radio tag reading apparatus has an interrogator and an antenna connected to the interrogator. The interrogator allows output power to be generated as an electromagnetic wave from the antenna to radio tags set opposite and near to the antenna. The radio tag is of a batteryless type and, upon receipt of the electromagnetic wave from the antenna, obtains drive power. The radio tag thus obtaining the electric power sends data to the interrogator.

For the radio tag to operate upon receipt of the electromagnetic wave, it is necessary that the radio tag receive electric power of a predetermined level. However, there is a problem that the reception power falls if the distance between the radio tag and the antenna of the radio tag reading apparatus (hereinafter called the space-apart distance) becomes large. There is also a problem that, if a plurality of radio tags are overlappingly arranged even in the case where the space-apart distance becomes shorter, the reception power falls at the individual radio tags.

In a structure of JPN PAT APPLN KOKAI PUBLICATION No. 2003-283364, a plurality of radio tags are arranged in an opposed relation to an antenna connected to the interrogator and, in order to increase the reception power of the individual radio tags, a radio wave reflection plate is arranged behind the respective radio tags, in which case it has a reflection surface including a circular curve or a portion of a similar curve. By doing so, a signal which is transmitted from the antenna is reflected on the radio wave reflection plate to allow it to be received by the individual radio tags.

BRIEF SUMMARY OF THE INVENTION

A plurality of envelopes, document sheets, etc., are arranged in narrow intervals with a radio tag attached thereto. For example, a plurality of envelopes or document sheets are arranged at adjacent intervals of 2 mm to about a few millimeters. In this state, the interrogator makes data communication with the respective radio tag through an antenna. At this time, it is necessary to bring the antenna up to the neighborhood of the radio tags.

JPN PTA APPLN KOKAI PUBLICATION No. 2003-283364 discloses a method by which a distance between the radio tags and the antenna is spaced apart from each other, a reflection plate is arranged behind the radio tags and the radio tag receives a radio wave from the reflection plate. In this method, the antenna cannot be moved nearer to the radio tags and, in a state in which a plurality of radio tags are densely arranged in an array, no adequate reception power can be obtained at some of these radio tags. It is, therefore, not possible to make data communication, thus presenting a problem.

Further, if, in a state in which about 10 document sheets or envelopes are overlappingly arranged, the antenna is moved nearer to the radio tags, it is possible to make full data communication with the radio tags. However, as many as 50 sheets of such items are overlappingly arranged, thus it is not possible to make full data communication.

According to the present invention, on the other hand, it is possible to read data from all the radio tags even if many radio tags are arranged in dense narrow intervals in an overlapped state.

According to an aspect of the present invention provides a radio tag reading apparatus characterized by comprises an antenna configured to radiate an electromagnetic wave to a plurality of radio tags set in a neighborhood thereof, conductors arranged along a radiation direction of the electromagnetic wave radiated from the antenna, and a reading apparatus body configured to read out data from the respective radio tags through the antenna.

BRIEF DESCRIPTION OF THE SEVERAL VIEWS OF THE DRAWING

FIG. 5 is a graph showing reception power against power measuring positions set on the radiation planes of a reader antenna with conductors in the present embodiment and a reader antenna without conductors;

FIG. 6 is a comparative graph showing the number of sheets read out by the reader antenna with conductors in the present embodiment and the reader antenna without conductors;

FIG. 13 is a perspective view showing still another modification of conductors to be arranged on the reader antenna in the first embodiment;

FIG. 14 is a perspective view showing a variation of the reader antenna in the first embodiment;

DETAILED DESCRIPTION OF THE INVENTION

The embodiments of the present invention will be described below with reference to the drawings.

First Embodiment

Figure 1:
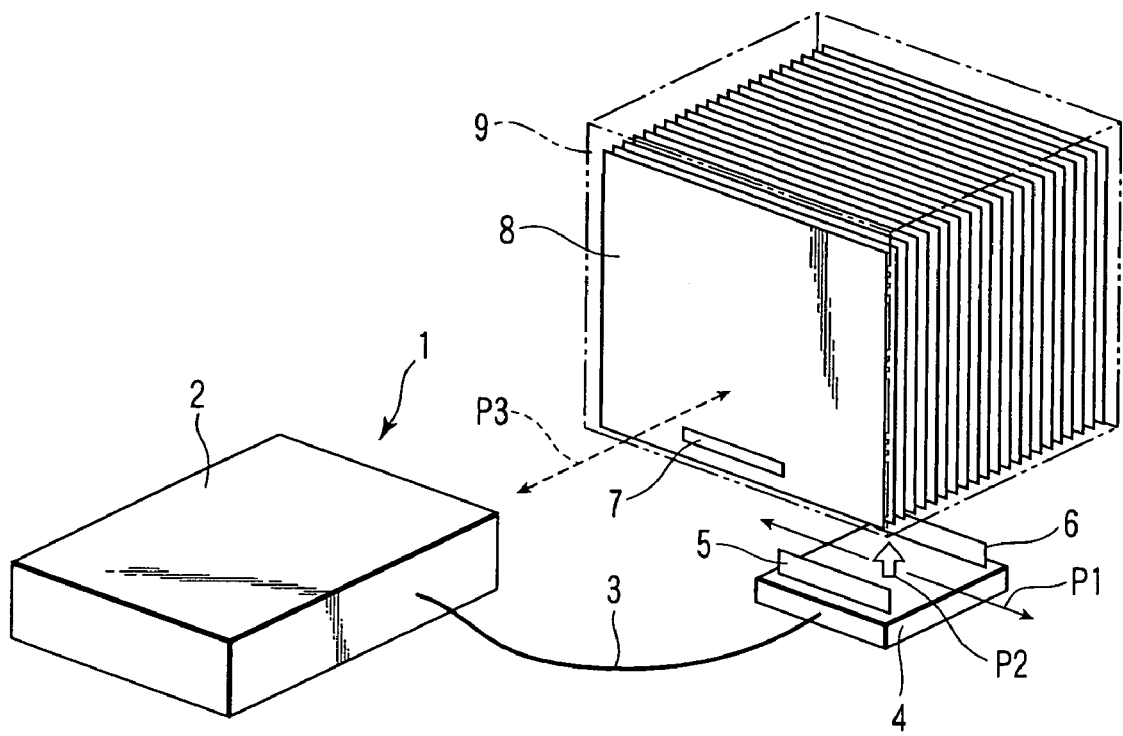
FIG. 1 is a perspective view showing a structure of an apparatus according to a first embodiment of the present invention.

As shown in FIG. 1, a radio tag reading apparatus 1 is such that a reader antenna 4 is connected through a coaxial cable 3 to an interrogator 2.

The reader antenna 4 is comprised of, for example, a 2.4 GHz plane antenna serving as a linearly polarized antenna with its polarization (electric field) direction as indicated by a solid line arrow P1 in FIG. 1.

The reader antenna 4 is so arranged that the radiation direction of its electromagnetic wave is set upward as indicated by an arrow P2 in FIG. 1.

The reader antenna 4 has flat plate-like rectangular conductors 5 and 6 on the opposed edge portions of its upper surface, that is, one conductor at one place and the other at the opposite place on the opposed edge portions of its electromagnetic wave radiation surface. The respective conductors 5 and 6 have their flat surfaces arranged substantially parallel to the polarization direction of the reader antenna 4 and along a radiation direction of the electromagnetic radiation from the reader antenna. That is, the respective conductors 5 and 6 are arranged substantially parallel to the direction indicated by the arrow P1 in FIG. 1 in a manner to be set perpendicular to the radiation surface of the antenna.

A storage case 9 is arranged above the reader antenna 4. The storage case 9 is arranged at an upper position than the ends of the respective conductors 5 and 6. The storage case 9, though not shown, is located on a base plate made of a material, such as polycarbonate or ABS resin, which allows passage of the electromagnetic wave. It is needless to say that the storage case 9 is also made of a material which allows a passage of the electromagnetic wave.

The storage case 9 holds many articles 8, such as envelopes or document sheets, arranged at narrow intervals with their surfaces opposite to each other in a manner to have an elongated rectangular radio tag 7 attached to the lower portion of one surface side of these articles 8.

The storage case 9 is so located that the attached radio tags 7 are arranged substantially parallel to the polarization direction of the reader antenna 4. In other words, the attached radio tags 7 have their longitudinal directions arranged substantially parallel to the polarization direction of the reader antenna 4.

Figure 2:
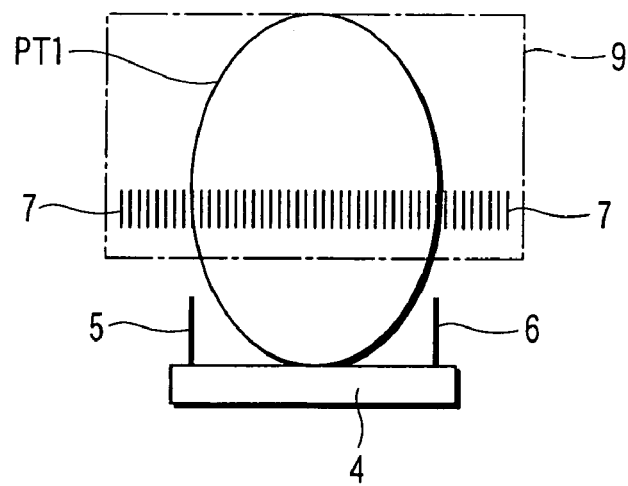
FIG. 2 is a view showing the first embodiment and explaining a relation between an array of radio tags and a radiation pattern of an electromagnetic wave from a reader antenna with conductors arranged.

In this structure, the radiation pattern of the radio wave radiated from the reader antenna 4 provides an upwardly elongated radiation pattern PT1 under the actions of the conductors 5 and 6 as shown in FIG. 2. As a result, the electric power density at a position above the reader antenna 4 increases. Even if, therefore, the radio tag 7 and adjacent radio tag 7 of the articles 8 are arranged at narrower intervals of about 2 to 3 mm for example, stronger electric power is supplied to the central portion of the radiation pattern PT1 and adequate electric power is fed to the radio tags at that central portion and its neighborhood. As a result, the radio wave-received radio tags 7 obtains adequate drive power and operates and, at a request from the interrogator 2, send corresponding data.

Figure 3:
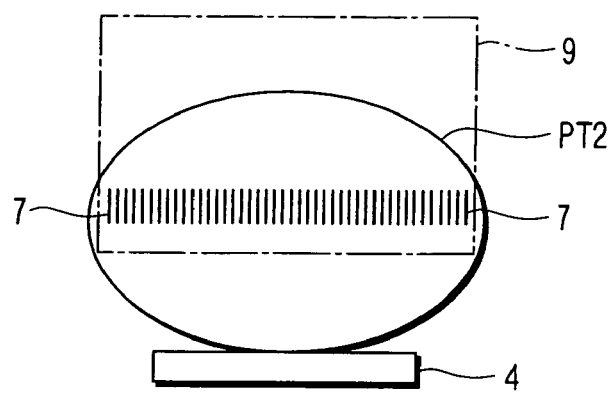
FIG. 3 is a view showing a relation between an array of radio tags and a radiation pattern from an electromagnetic wave from a reader antenna with no conductors.

And the storage case 9 with many articles 8 held therein is moved in a direction orthogonal to the polarization direction of the reader antenna 4 as indicated by an arrow P3 of a dotted line in FIG. 1. By doing so, all the radio tags 7 in the storage case 9 move past the middle portion of the radiation pattern PT of the radio wave radiated from the reader antenna 4. Thus, the interrogator 2 can read data from all the radio tags 7.

Where use is made of a reader antenna 4 without the conductors 5 and 6, then the radiation pattern of the radio wave radiated from the reader antenna 4 becomes a radiation pattern PT2 expanded sideways as shown in FIG. 3. For this reason, the reader antenna 4 can no longer increase the electric power density at a position above the reader antenna 4. Hence, no adequate electric power can be supplied to the radio tags 7. As a result, the interrogator 2 cannot read the data from some radio tags 7.

For the measurement of any received electric power, use is made of an a×b sized plane antenna of about 80 mm×80 mm. The reader antenna 4 has conductors 5 and 6 of a length c of about 60 mm and a height d of about 10 mm, these conductors 5 and 6 being mounted at an interval e of about 60 mm.

Figure 4A:
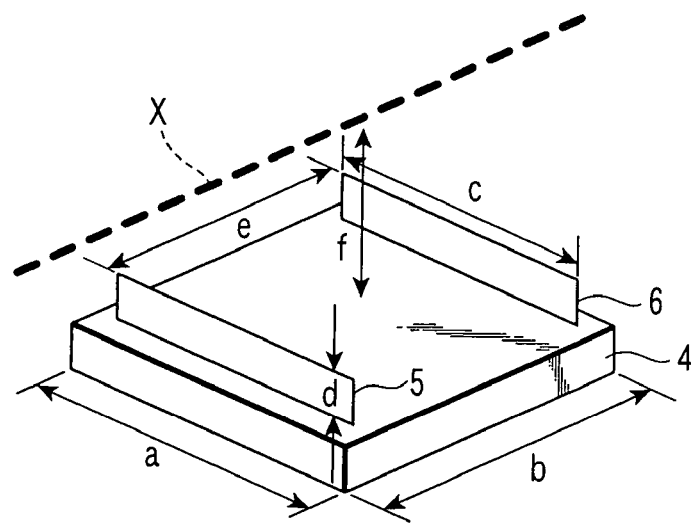
FIG. 4A is a perspective view showing the first embodiment and an example of an electric power measuring position relative to a radiation plane of a reader antenna with conductor arranged thereon.
Figure 4B:
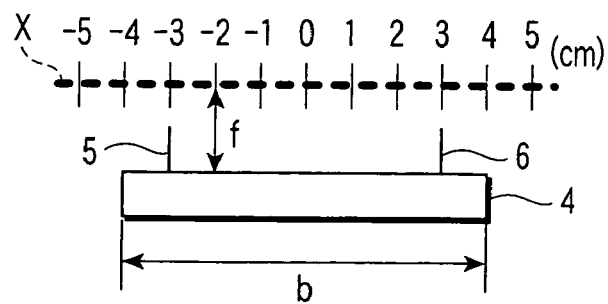
FIG. 4B is a side view showing the first embodiment and an example of an electric power measuring position relative to the radiation plane of the reader antenna with conductors arranged.

The measurements of the reception electric power were made at a plurality of electric power measuring positions in a direction of a dashed line X in FIGS. 4A and 4B corresponding to a direction of an array of radio tags 7 at a position of a height f of 20 mm, that is, at a position 10 mm higher than the upper end of the conductor (5, 6), from the radiation surface of the reader antenna 4 with the conductors 5 and 6 mounted thereon. As a result, a graph g1 as shown in FIG. 5 is obtained.

The graph g1 plots measurement values of the reception electric power at respective electric power measuring positions of 0 cm, ±1 cm, ±2 cm, ±3 cm, ±4 cm, ±5 cm along the dashed line X, with 0 indicating an upper 20 mm position of the center of the radiation plane of the reader antenna 4. Note that the respective measuring values are linked together.

The measurement of the reception electric power using the reader antenna 4 without conductors 5, 6 was made under the same condition as that of the reader antenna 4 with the conductors 5, 6. As a result, a graph g2 as shown in FIG. 5 was obtained.

As understood from the graphs g1 and g2, at the middle portion within the upper ±2 cm of the reader antenna 4, the reception electric power is made higher in the case of mounting the conductors 5, 6 than in the case of no mounted conductors 5, 6. The electric power density at the upper middle portion of the reader antenna 4 is made higher in the case of mounting the conductors 5, 6. Further, in a range exceeding ±3 cm, the reception electric power becomes abruptly lower in the case of mounting the conductors 5, 6 and, conversely, it becomes greater in the case of mounting no conductors 5, 6.

In FIG. 4, the height d of the conductors 5, 6 was set to about 10 mm. From experimental results, this height is found suitable in 2.4 GHz band and, in the 2.4 GHz band, for example, if the height of the conductors 5, 6 is 2 to 3 mm, no radiation pattern PT1 as shown in FIG. 2 is obtained, and a pattern becomes a radiation pattern nearer to the radiation pattern PT2 in the case of mounting the conductors as shown in FIG. 3.

If the conductors 5, 6 are greater in height, the radiation pattern becomes the radiation pattern PT1 as shown in FIG. 2. The radio tag 7 is positioned away from the reader antenna 4 to an extent to which the conductors 5, 6 have to be set at a higher position due to physical restrictions, such as the thickness of the storage case 9, the thickness of the base plate on the storage case 9 and a required space defined between the upper end of the conductor and the base plate.

If, for example, the height of the conductors 5, 6 is set to be 50 mm and the radio tag 7 is set to a position spaced about 10 mm away from the upper end of the conductors 5, 6, then the radio tag 7 has to be set to a position about 60 mm higher from the radiation plane of the reader antenna 4.

When, however, the radiation tag 7 is set to a greater spaced-away position from the radiation plane of the reader antenna 4, the reception electric power becomes weaker and hence the radio tags 7 arranged at narrower intervals cannot obtain adequate electric power for operation. From this it is found that the conductors 5, 6 set on the radio antenna 4 have an optimal value for their height.

Now, the reading-out of the articles 8 will be set out below.

For example, 100 sheets of articles 8 are held as an array in the storage case 9 at intervals of 2 mm. This storage case 9 is placed on the base plate and the height position of the radio tag 7 is set to be about 20 mm from the radiation plane of the reader antenna 4. By doing so, the interrogator 2 effects the read-out of the radio tag 7 with the use of the reader antenna 4.

Where, as shown in FIG. 6, use was made of the reader antenna 4 with the conductors 5, 6 mounted thereon, the interrogator 2 was able to read data from all the radiation tags 7 attached to the 100 sheets of articles 8 by moving the storage case 9.

Where, on the other hand, use was made of a reader antenna 4 without such mounted conductors, the interrogator 2 was able to read out data from only 76 of 100 sheets of articles even if the storage case 9 was moved around.

In this way, the reader antenna 4 can raise the electric power fed to radio tags 7 arranged on an upper middle portion by arranging the conductors 5, 6 along the radiation direction of a radiating electromagnetic wave. As a result, even if the surfaces of a plurality of radio tags 7 are arranged at very narrow intervals of, for example, 2 mm, the interrogator 2 can make data communication with all the radio tags 7 through the reader antenna 4 and it is possible to positively read out the data from all the radio tags.

Although, in this embodiment, the linearly polarized antenna is used as the reader antenna 4, the present invention is not restricted thereto and the same result is also obtained by the use of a circularly polarized antenna.

Since the linearly polarized antenna is higher in gain than the circularly polarized antenna by about 3 dB, it is possible to a feed higher electric power to the radio tags. Where, therefore, the data is read out from the radio tags arranged at narrow intervals, the linearly polarized antenna is more suitable.

Although in this embodiment use is made of the conductors 5, 6 by way of example, their dimensions and intervals are not restricted to this embodiment.

Although the reader antenna 4 used in this embodiment has its conductors 5 and 6 arranged at two places at opposed marginal edge portions of its upper surface, the arrangement of the conductors is not restricted thereto.

Figure 7:
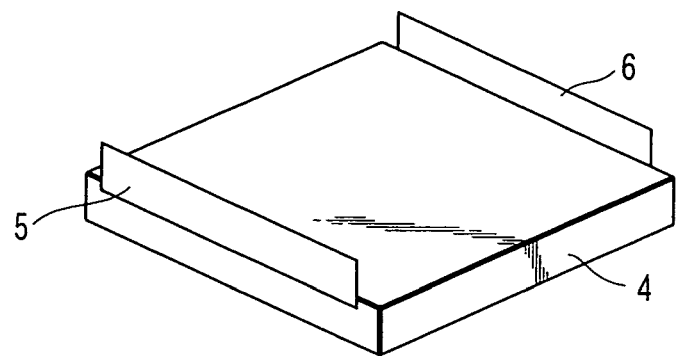
FIG. 7 is a perspective view showing a modification of conductors to be arranged on the reader antenna in the first embodiment.

As shown in FIG. 7, for example, conductors 5, 6 may be arranged at two places on the opposed sidewall portions of a reader antenna 4.

Figure 8:
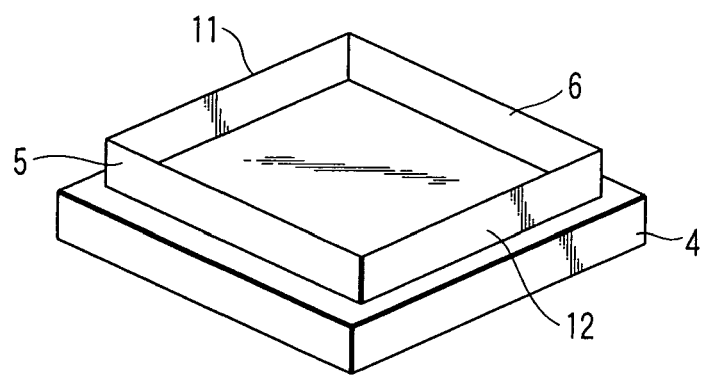
FIG. 8 is a perspective view showing another modification of conductors to be arranged on the reader antenna in the first embodiment.

Further, as shown in FIG. 8, use may be made of four conductors 5, 6, 11 and 12. In this case, the conductors 5 and 6 are arranged at two places at those opposed marginal edge portions of the upper surface of a reader antenna 4 and the conductors 11 and 12 are arranged at two places at the remaining opposed marginal edge portions of the upper surface of the reader antenna, so that the central portion of the radiation plane of the reader antenna 4 is surrounded with these four conductors, 5, 6 and 11, 12.

Figure 9:
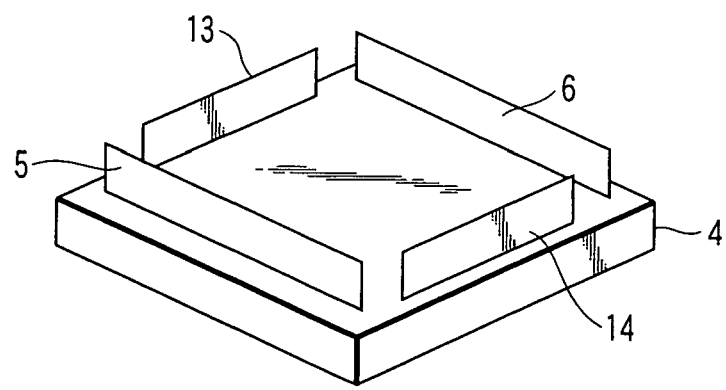
FIG. 9 is a perspective view showing still another modification of conductors to be arranged on the reader antenna in the first embodiment.

As shown in FIG. 9, shorter conductors 13, 14 may be used, in place of the conductors 11, 12, so that a clearance space is defined between the ends of the conductors 13, 14 and those of the conductors 5, 6.

Although the conductors 5, 6 used in the present embodiment are so mounted as to be erected vertical to the reader antenna, the present embodiment is not restricted thereto.

Figure 10:
FIG. 10 is a side view showing still another modification of conductors to be arranged on the reader antenna in the first embodiment.

As shown in FIG. 10, for example, the conductors 5, 6 may be so mounted as to be tilted relative to the reader antenna 4.

Although, in this embodiment, flat, plate-like rectangular conductors are used as the conductors, the present invention is not restricted thereto.

Figure 11:
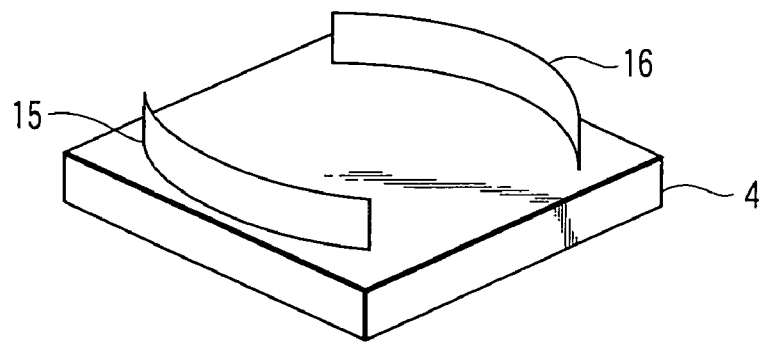
FIG. 11 is a perspective view showing still another modification of conductors to be arranged on the reader antenna in the first embodiment.

As shown in FIG. 11, for example, curved plate-like conductors 15 and 16 may be used and, in this case, these conductors 15, 16 are arranged along the electromagnetic wave radiation direction from the reader antenna 4.

Figure 12:
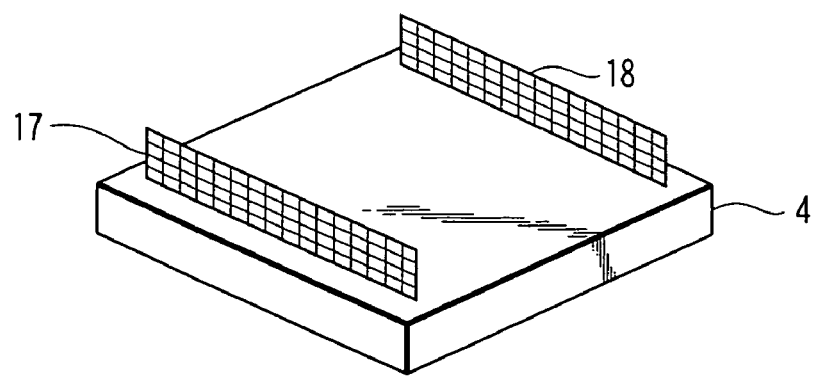
FIG. 12 is a perspective view showing still another modification of conductors to be arranged on the reader antenna in the first embodiment.

Further, as shown in FIG. 12, use may be made of grid-like or mesh-like conductors 17, 18.

As shown in FIG. 13, use may be made of conductors 19, 20 each comprised of a plurality of rod-like conductors arranged at predetermined intervals along electromagnetic wave radiation direction.

Although, in the present embodiment, as the reader antenna 4 use is made of the plane antenna, the present invention is not restricted thereto and use may be made of an antenna of other configurations.

As shown in FIG. 14, for example, use may be made of a dipole antenna 22 connected to a feeding point 21. The dipole antenna is generally lower in gain than the plane antenna. In order to compensate for the lower gain, as shown in FIG. 14, a reflection plate 23 comprised of a conductor is provided below the dipole antenna 22 to allow an electromagnetic wave to be reflected only in an up direction. Conductors 5, 6 are arranged around the dipole antenna 22. By doing so, the dipole antenna 22 can have greate power to radiate electromagnetic waves upwards. As a result, adequate electric power can be fed to a radio tag placed above the dipole antenna 22.

Second Embodiment

It is to be noted that the same reference numerals are employed in this second embodiment to designate parts or elements corresponding to those shown in the first embodiment. And any detailed explanation of it is, therefore, omitted.

Figure 15:
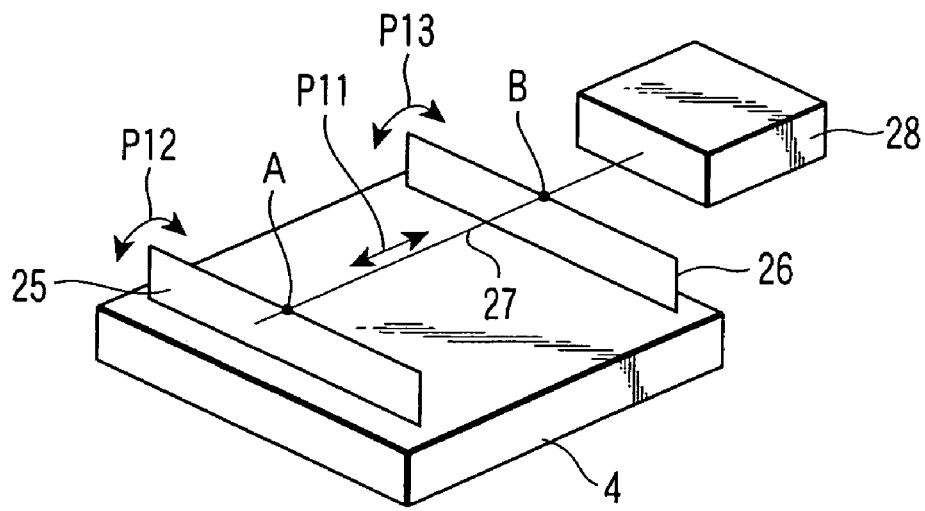
FIG. 15 is a perspective view showing a structure of the reader antenna in a second embodiment of the present invention.

As shown in FIG. 15, a reader antenna 4 has its conductors 25, 26 arranged at two places on opposed marginal edge portions of an upper surface thereof along an electromagnetic wave radiation direction, these conductors having a flat, plate-like rectangular shape. The reader antenna 4 is connected through a coaxial cable to an interrogator 2, in the same way as in the first embodiment.

The conductors 25, 26 have an operation rod 27 semi-fixed at both a point A and a point B to the upper middle ends thereof, respectively.

The operation rod 27 is coupled to an actuator 28 and constitutes, together with the actuator, a variable mechanism.

The operation rod 27 is reciprocably operated by the actuator 28 as indicated by arrows P11 in FIG. 15 to allow the erect angles of the respective conductors 25, 26 to vary relative to a radiation plane of the reader antenna 4. At this time, the respective conductors 25 and 26 swing through the mutually same angles as indicated by arrows P12 and P13 in Figure under a reciprocable action of the operation rod 27.

Figure 16:
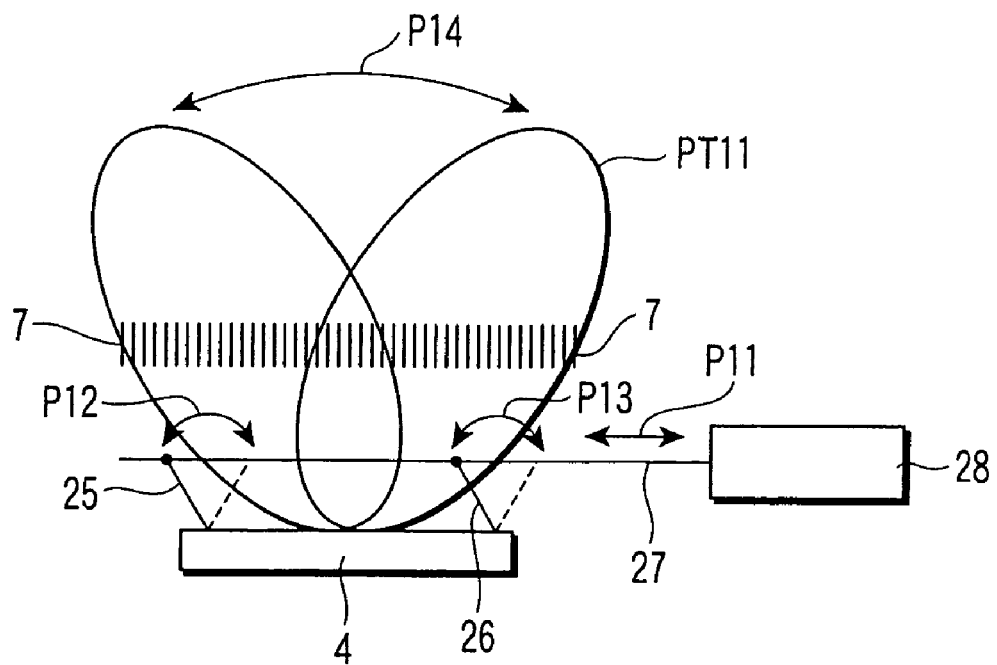
FIG. 16 is a view for explaining the action of the reader antenna in the second embodiment.

When, in this structure, the actuator 28 reciprocably moves the operation rod 27 as indicated by the arrow P11 in FIG. 16, the respective conductors 25 and 26 swing through the mutually the same angle as indicated by arrows P12 and P13 in the Figure. By this action, the reader antenna 4 allows the electromagnetic wave radiation pattern PT11 which is radiated to vary only through a predetermined angle under the angle variation of the respective conductors 25, 26 as indicated by arrows P14 in the Figure.

By the variation of the radiation pattern PT11, the reader antenna 4 can feed adequate electric power to a plurality of radio tags 7 arranged as an array. Thus, the interrogator can read out data from all the radio tags 7 in the storage case without moving the storage case with the articles held therein. Even if the storage case needs to be moved, it is only necessary to move it to a small extent.

This embodiment also obtains the same operation advantage as that in the first embodiment above.

Third Embodiment

It is to be noted that the same reference numerals are employed in this embodiment to designate parts or elements corresponding to those shown in the preceding embodiments and any detailed explanation of it is, therefore, omitted.

Figure 17:
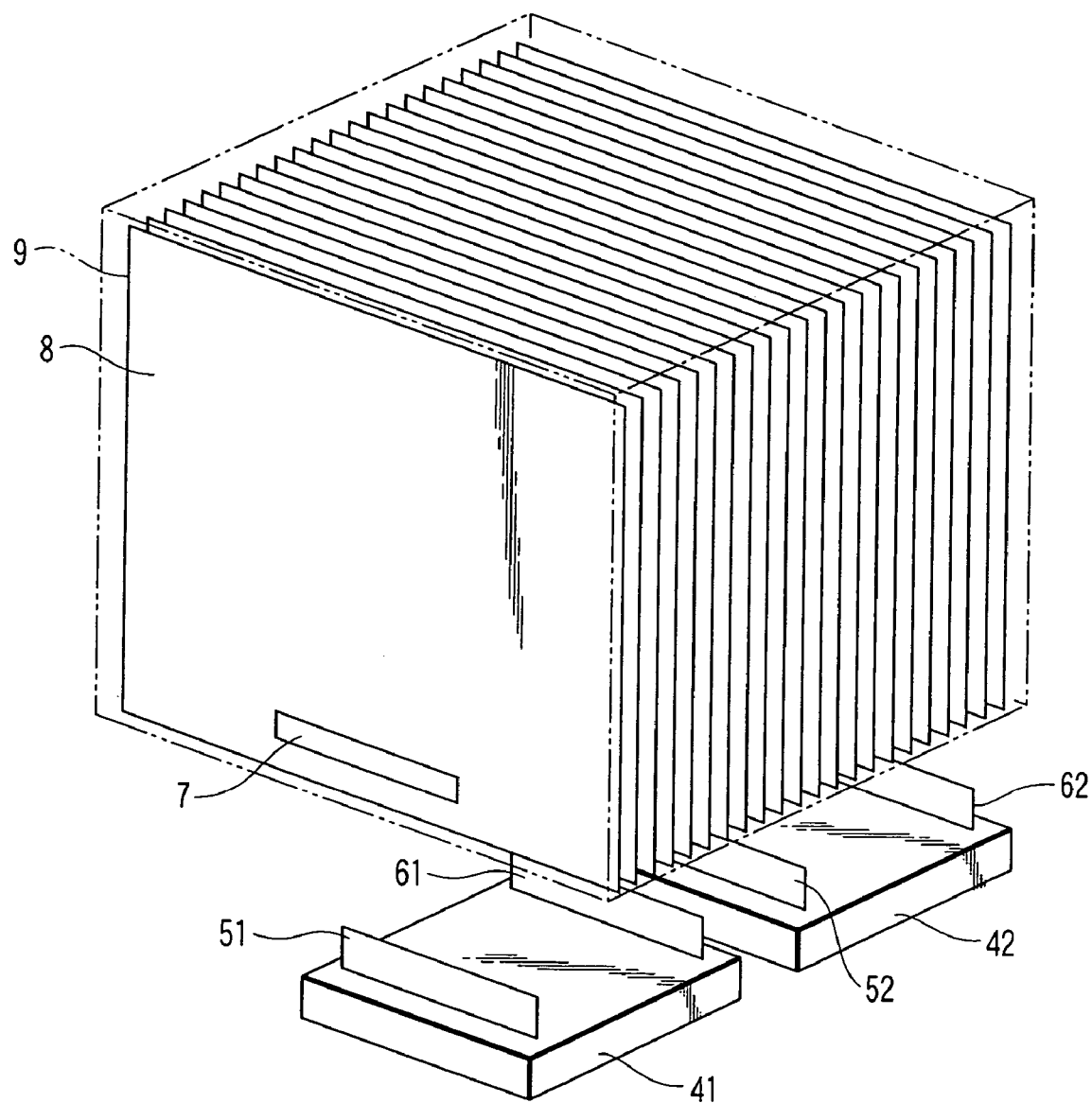
FIG. 17 is a perspective view showing a relation of an array of reader antennas and a storage case with an array of radio tags in a third embodiment of the present invention.

As shown in FIG. 17, a reader antenna is comprised of a pair of reader antennas 41, 42 each constituting a linearly polarized/plane antenna type. The respective reader antennas 41, 42 are connected to an interrogator 2 through a corresponding coaxial cable, as in the case of the first embodiment above.

The reader antenna 41 has its flat plate-like rectangular conductors 51, 61 arranged at two places on those opposed marginal edge portions of a radio wave radiation surface. The conductors 51 and 61 have their flat surface arranged substantially parallel with the polarization direction of the reader antenna 41 and along the radiation direction of an electromagnetic wave from the reader antenna 41.

The reader antenna 42 has its flat-like rectangular conductors 52, 62 arranged at two places on opposed marginal edge portions of a radio wave radiation surface. The conductors 52, 62 have their flat surfaces arranged substantially parallel to the polarization direction of the reader antenna 42 and along the radiation direction of an electromagnetic wave from the reader antenna.

The reader antennas 41 and 42 are so arranged as to have their radiation directions set substantially parallel to each other. A storage case 9 having a plurality of articles 8 held each with a radio tag attached thereto is set substantially parallel to the polarization directions of the reader antennas 41 and 42.

A pair of reader antennas 41, 42 creates a radiation pattern above their areas so that a whole radio wave radiation area becomes broader. As a result, the radio tag reading apparatus can increase the number of radio tags capable of reading out data with a storage case 9 set in a stationary state. Thus, the distance the storage case 9 needs to move so that the radio tag reading apparatus may read data from all radio tags 7 contained in the case 9 can be shortened. As the case may be, the storage case 9 can be set stationary.

Even in this embodiment, it is possible to obtain the same advantage as in the case of the preceding embodiment.

Although in the above-mentioned embodiment the 2.4 GHz band is used as a communication frequency band between the reader antenna and the radio tags, the present invention is not restricted thereto and any other frequency band may be used.

According to the present invention, it is possible to read out data from a plurality of radio tags attached to a plurality of envelopes in a bundle, that is, from a plurality of radio tags with the data stored therein, by radiating an electromagnetic wave from the antenna of a radio tag reading apparatus to the plurality of radio tags in a bundle. Such radio tags are utilized in a state attached to each postal envelop.

What is claimed is:

1. A radio tag reading apparatus comprising:
   an antenna configured to radiate polarized electromagnetic waves to a plurality of radio tags set in a neighborhood thereof, the antenna having a generally flat upper surface from which the electromagnetic waves are radiated;
   a plurality of spaced apart and opposed conductors on and extending away from the antenna surface for heightening the density of the polarized electromagnetic waves toward the tags; and
   a reader apparatus configured to read out data from the respective radio tags through the antenna.

2. A radio tag reading apparatus comprising:
   an antenna configured to radiate polarized electromagnetic waves to a plurality of radio tags set in a neighborhood thereof, the antenna having a generally flat upper surface from which the electromagnetic waves are radiated;
   conductors arranged at or around the marginal edge sides of the upper surface of the antenna, said conductors being a plurality of spaced apart and opposed conductors on and extending from the antenna upper surface along a radiation direction of the polarized electromagnetic waves radiated from the antenna to heighten the density of the electromagnetic waves in a selected direction; and
   a reading apparatus body configured to read out data from the respective radio tags through the antenna.

3. A radio tag reading apparatus according to claim 1, wherein the antenna is a linearly polarized antenna and the conductors are arranged substantially parallel to the polarization direction of the linearly polarized antenna.

4. A radio tag reading apparatus according to claim 1, wherein the antenna is a linearly polarized plane antenna and two conductors are arranged at the opposed marginal edge sides of the plane antenna in a direction substantially parallel to the radiation direction.

5. A radio tag reading apparatus according to claim 1, wherein the antenna is a linearly polarized plane antenna and the conductors are arranged at the opposed marginal edge sides in a direction substantially parallel to the polarization direction of the linearly polarized antenna and a variable mechanism configured to have their conductors mutually turned through the same angle to allow the angle between the respective conductor and the radiation plane of the linearly polarized antenna to vary.

6. A radio tag reading apparatus according to claim 1, wherein the antenna is a linearly polarized antenna and the conductors include four conductors arranged along the marginal edge sides of the antenna.

7. A radio tag reading apparatus according to claim 1, wherein the antenna is a linearly polarized antenna and the conductors are aligned at an acute angle relative to the upper surface of the antenna.

8. A radio tag reading apparatus according to claim 1, wherein the antenna is a linearly polarized antenna and the conductors are curved conductors.

9. A radio tag reading apparatus according to claim 1, wherein the antenna is a linearly polarized antenna and the conductors are arranged in one of a grid pattern and a mesh pattern.

10. A radio tag reading apparatus according to claim 1, wherein the antenna is a linearly polarized antenna and the conductors are rod-shaped conductors arranged perpendicular to the upper surface of the antenna and along a radiation direction of the electromagnetic waves.

11. A radio tag reading apparatus according to claim 1 which further comprises a mechanism connected to the conductors for varying the angle of the conductors relative to the antenna.

* * * * *